US009425505B2

(12) United States Patent
Kong et al.

(10) Patent No.: US 9,425,505 B2
(45) Date of Patent: Aug. 23, 2016

(54) INTEGRATED PHASE-SHIFTING-AND-COMBINING CIRCUITRY TO SUPPORT MULTIPLE ANTENNAS

(75) Inventors: Lingkai Kong, Albany, CA (US); Farshid Aryanfar, Sunnyvale, CA (US)

(73) Assignee: Lattice Semiconductor Corporation, Portland, OR (US)

(*) Notice: Subject to any disclaimer, the term of this patent is extended or adjusted under 35 U.S.C. 154(b) by 565 days.

(21) Appl. No.: 13/988,047

(22) PCT Filed: Oct. 31, 2011

(86) PCT No.: PCT/US2011/058529
§ 371 (c)(1),
(2), (4) Date: May 17, 2013

(87) PCT Pub. No.: WO2012/067796
PCT Pub. Date: May 24, 2012

(65) Prior Publication Data
US 2013/0241772 A1    Sep. 19, 2013

Related U.S. Application Data

(60) Provisional application No. 61/415,273, filed on Nov. 18, 2010.

(51) Int. Cl.
*H01Q 3/22* (2006.01)
*H01Q 3/26* (2006.01)
*H04B 7/08* (2006.01)

(52) U.S. Cl.
CPC .............. *H01Q 3/2694* (2013.01); *H01Q 3/26* (2013.01); *H01Q 3/2682* (2013.01); *H04B 7/084* (2013.01)

(58) Field of Classification Search
CPC ............ H01Q 3/22; H01Q 3/00; H01Q 3/26; H01Q 3/2682; H01Q 3/2694; G01S 13/00; H04B 7/084
USPC .................. 342/375, 175, 377, 372; 327/155
See application file for complete search history.

(56) References Cited

U.S. PATENT DOCUMENTS 4,229,744 A * 10/1980 Luedtke ............... H01Q 1/3275
                                                  343/713
4,326,294 A *  4/1982 Okamoto ............... H04B 7/084
                                                  455/139

(Continued)

OTHER PUBLICATIONS

Afsahi, Ali et al., "A Low-Power Single-Weight-Combiner 802.11abg SoC in 0.13 μm CMOS for Embedded Applications Utilizing an Area and Power Efficient Cartesian Phase Shifter and Mixer Circuit," IEEE Journal of Solid-State Circuits, vol. 43, No. 5, May 2008. 18 pages.

(Continued)

*Primary Examiner* — Harry Liu
(74) *Attorney, Agent, or Firm* — Fenwick & West LLP

(57) ABSTRACT

The disclosed embodiments generally relate to techniques for processing signals received from multiple antennas. More specifically, the disclosed embodiments relate to a system that uses an integrated phase-shifting-and-combining circuit to process signals received from multiple antenna elements. This circuit applies a specified phase shift to the input signals, and combines the phase-shifted input signals to produce an output signal. In some embodiments, the integrated phase-shifting-and-combining circuit uses a current-steering mechanism to perform the phase-shifting-and-combining operations. This current-steering mechanism operates by converting the input signals into associated currents, and then steering each of the associated currents through multiple pathways which have different delays. Next, the currents from the multiple pathways for the associated currents are combined to produce the output signal. During this process, while steering each of the associated currents through multiple pathways to achieve different phase shifts, complementary impedance changes through the multiple pathways cause the aggregate impedance at the output to remain substantially constant.

21 Claims, 18 Drawing Sheets

(56) References Cited

U.S. PATENT DOCUMENTS

| | | | |
|---|---|---|---|
| 6,236,363 B1* | 5/2001 | Robbins | H01Q 3/267 342/169 |
| 6,954,623 B2* | 10/2005 | Chang | H03F 3/602 330/124 R |
| 7,154,440 B2* | 12/2006 | Toncich | H03C 3/20 333/139 |
| 7,355,492 B2 | 4/2008 | Hyman et al. | |
| 2003/0122710 A1 | 7/2003 | Lehtomaki et al. | |
| 2005/0136856 A1 | 6/2005 | Goldberg | |
| 2006/0229042 A1 | 10/2006 | Afsahi et al. | |
| 2007/0058768 A1* | 3/2007 | Werner | H03D 13/004 375/376 |
| 2009/0153413 A1* | 6/2009 | Leisten | H01Q 1/243 343/702 |
| 2009/0179674 A1 | 7/2009 | Tamura et al. | |
| 2009/0184864 A1* | 7/2009 | Barak | H01L 23/66 342/175 |
| 2009/0315760 A1* | 12/2009 | Mousavi Bafrooei | G01S 3/42 342/174 |
| 2009/0315774 A1 | 12/2009 | Son et al. | |
| 2010/0056070 A1 | 3/2010 | Miyake et al. | |
| 2010/0171567 A1 | 7/2010 | Krishnaswamy et al. | |

OTHER PUBLICATIONS

Biglarbegian, Behzad et al., "Millimeter-Wave Reflective-Type Phase Shifter in CMOS Technology," IEEE Microwave and Wireless Components Letters, vol. 19, No. 9, Sep. 2009. 3 pages.

Cohen, Emanuel et al., "A Bidirectional TX/RX Four-Element Phased Array at 60 GHz With RF-IF Conversion Block in 90-nm CMOS Process," IEEE Transactions on Microwave Theory and Techniques, vol. 58, No. 5, May 2010. 9 pages.

International Preliminary Report on Patentability (Chapter I) dated May 30, 2013 in International Application No. PCT/US2011/058529. 8 pages.

Paramesh, Jeyanandh et al., "A Four-Antenna Receiver in 90-nm CMOS for Beamforming and Spatial Diversity," IEEE Journal of Solid-State Circuits, vol. 40, No. 12, Dec. 2005. 10 pages.

PCT International Search Report and the Written Opinion dated Apr. 18, 2012 for Int'l. Application No. PCT/US2011/058529. 12 Pages.

Yu et al., "A 60 GHz Phase Shifter Integrated with LNA and PA in 65 nm CMOS for Phased Array Systems," IEEE Journal of Solid-State Circuits, vol. 45 No. 9, Sep. 2010, pp. 1697-1709. 13 pages.

\* cited by examiner

INTEGRATED PHASE-SHIFTING-AND-COMBINING CIRCUITRY TO SUPPORT MULTIPLE ANTENNAS

BACKGROUND

1. Field

The disclosed embodiments generally relate to systems that process signals received from multiple antennas. More specifically, the disclosed embodiments relate to a system that uses an integrated phase-shifting-and-combining circuit to process signals received from multiple antennas which, for example, can be used to implement a phased-array antenna system.

2. Related Art

In wireless communication systems, performance can be improved by using multiple antennas to directionally transmit and receive electromagnetic signals. For example, a phased-array antenna system comprised of multiple antenna elements and associated signal-processing circuitry can be used to directionally transmit and receive an electromagnetic beam. In such a phased-array antenna system, the direction of the beam can be steered by adjusting the phase shifting for signals associated with the constituent antenna elements. Two key components of a phased-array system, which determine its overall performance, are phase shifters and combiners. Unfortunately, when phase shifters and combiners are implemented using on silicon using CMOS technologies, they are often associated with high signal loss at RF and mm-wave frequencies, and occupy a significant amount of silicon area.

Hence, it is desirable to reduce this signal loss and required area, in particular to facilitate the use of phased-array antennas in compact, low-power systems, such as in mobile devices.

DETAILED DESCRIPTION

The disclosed embodiments generally relate to techniques for processing signals received from multiple antennas. More specifically, the disclosed embodiments relate to a system that uses an integrated phase-shifting-and-combining circuit to process signals received from multiple antenna elements. This circuit applies a specified phase shift to the input signals, and combines the phase-shifted input signals to produce an output signal. In some embodiments, the integrated phase-shifting-and-combining circuit uses a current-steering mechanism to perform the phase-shifting-and-combining operations. This current-steering mechanism operates by converting the input signals into associated currents, and then steering each of the associated currents through multiple pathways which have different delays. Next, the currents from the multiple pathways for the associated currents are combined to produce the output signal. During this process, while steering each of the associated currents through multiple pathways to achieve different phase shifts, complementary impedance changes through the multiple pathways cause the aggregate impedance at the output to remain substantially constant.

Figure 1:
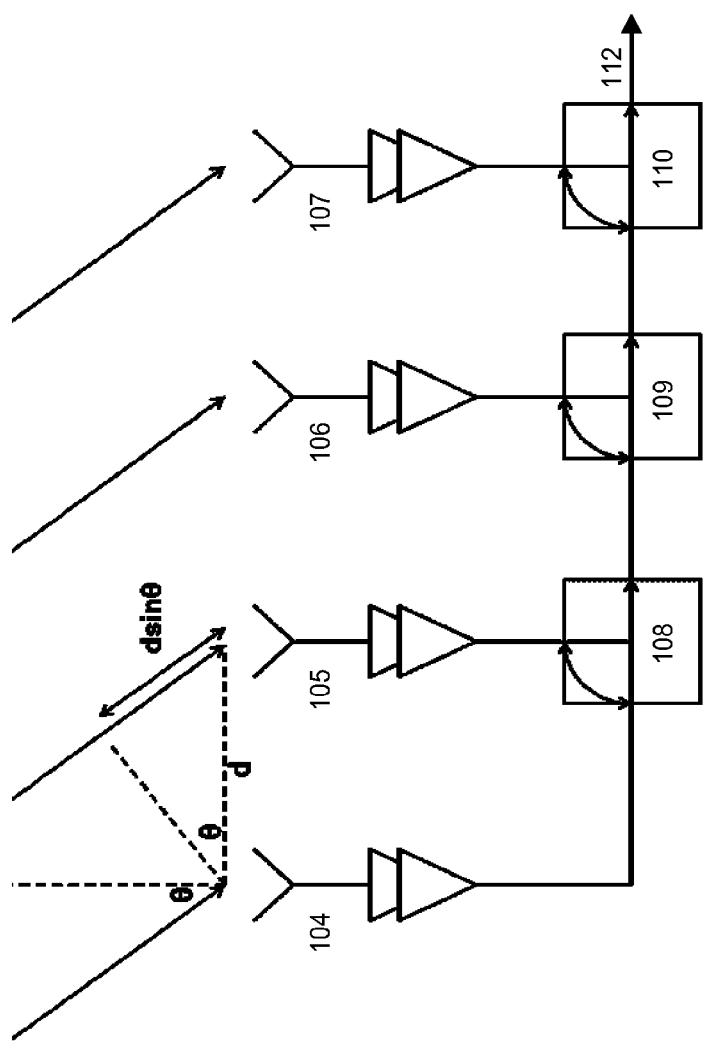
FIG. 1 illustrates a phase array with associated phase-shifting-and-combining circuits in accordance with the disclosed embodiments.

FIG. 1 illustrates a phase array that includes four antenna elements 104-107, which are coupled to three phase-shifting-and-combining elements 108-110 in accordance with the disclosed embodiments. During operation of this phase array, electromagnetic waves arrive at the antenna elements 104-107 with different phases, wherein the phase differences depend on the angle of arrival "θ" as well as the spacing "d" between antenna elements 104-107. The received electromagnetic waves create electromagnetic signals in the antenna elements 104-107 which feed into the associated phase-shifting-and-combining elements 108-110. Note that each of the phase-shifting-and-combining elements 108-110 receives two input signals and combines them after applying phase shifts to each of them. In the example illustrated in FIG. 1, this phase-shifting-and-combining process takes place three times (in the three phase-shifting-and-combining elements 108-110) to produce the combined signal at the output 112.

Two-Input Circuit

Figure 2A:
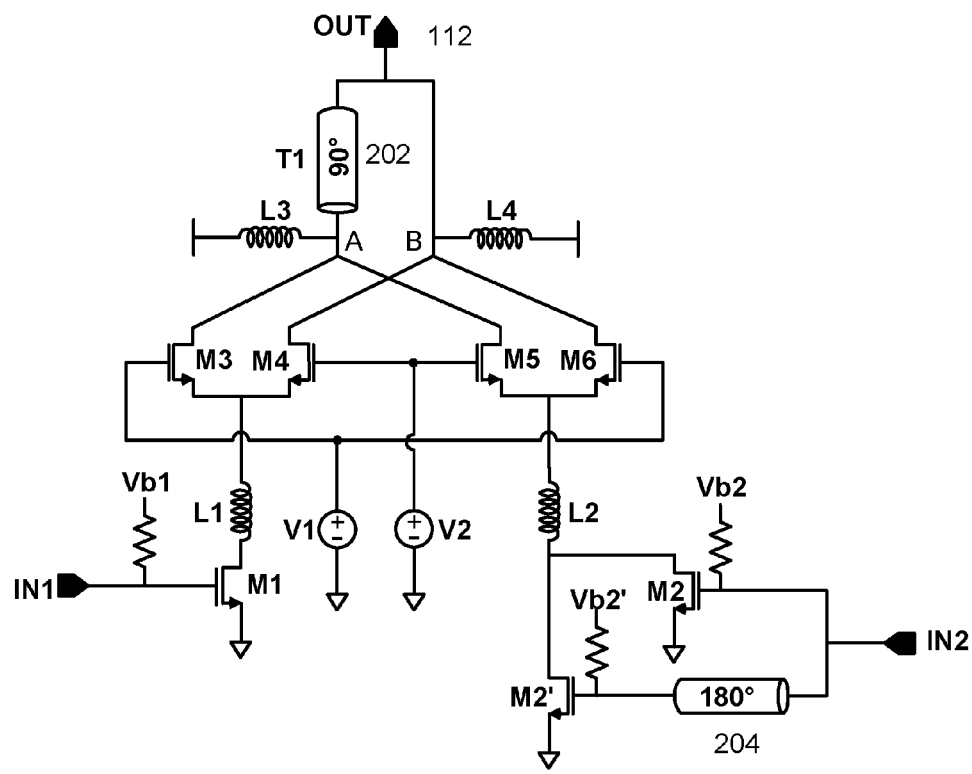
FIG. 2A illustrates the internal structure of a two-input phase-shifting-and-combining circuit in accordance with the disclosed embodiments.

FIG. 2A illustrates the internal structure of one of the two-input integrated phase-shifting-and-combining elements 108-110 in accordance with the disclosed embodiments. This integrated phase-shifting-and-combining element aligns the phases of the two input signals and then combines them to produce an output signal. The achievable phase differences between two signals cover an entire 360° range which enables the beam-steering mechanism to achieve focusing at any desired angle. Note that, in order to minimize gain fluctuation over the range of possible phase settings, it is desirable to minimize impedance variations for each integrated phase-shifting-and-combining element. To achieve this, the circuit illustrated in FIG. 2A applies substantially opposite phase shifts to the two input signals with respect to a reference phase at a midpoint between the phases of the two input signals. This is achieved by converting signals from the antenna elements into currents and then steering the currents through multiple parallel pathways having different delays. This circuit is designed so that complementary impedance changes associated with pairs of parallel pathways from the input to the output of the circuit result in a substantially constant impedance over the entire phase-shifting range.

Note that the circuit illustrated in FIG. 2A uses a combination of a continuous +/−90° phase shifter 202 and a single-bit 180° phase shifter 204 to cover the full 360° phase-shifting range. During operation, this circuit receives two input signals, IN1 and IN2, from two separate antenna elements. Signal IN1 feeds through a common input transistor M1, and the output current from transistor M1 flows through two parallel paths which pass through transistors M3 and M4, respectively. Note that the dividing ratio for this current between the two paths is controlled by the bias voltages V1 and V2 on the gates of transistors M3 and M4, respectively. Also note that optional inductor L1 can be used to tune out the capacitance at the source of M3/M4 and the drain of M1, thereby increasing the bandwidth of this node. (Note that inductors L1-L4 in FIG. 2A are optional.) The output of transistor M3 then feeds through a 90° delay element and connects to the drain of transistor M4. Hence, when V1 is set to the supply voltage and V2 is set to zero, the signal IN1 experiences a 90° phase shift. In contrast, when V2 is set to the supply voltage and V1 is set to zero, the signal IN1 experiences a 0° phase shift. At each of these bias voltage settings, transistors M5 and M6 operate similarly to transistors M3 and M4 except that they operate on input signal IN2. (Note that the terms "delay element" and "phase shifter" are used interchangeably throughout this specification and the attached claims. Also, note that a delay element can be implemented using: an inductor, a transmission line, or an impedance network.)

The output impedances of transistors M3, M4, M5 and M6 are strongly dependant on their bias voltage. Hence, a change in a bias voltage to achieve a given phase setting will introduce gain variation. However, in the circuit illustrated in FIG. 2A, the effective impedance at points A and B remains substantially constant across all phase shifter settings due to complementary impedance changes in the parallel paths connecting to them. As a result, the overall gain for both paths remains flat over the range of possible phase settings.

Figure 2B:
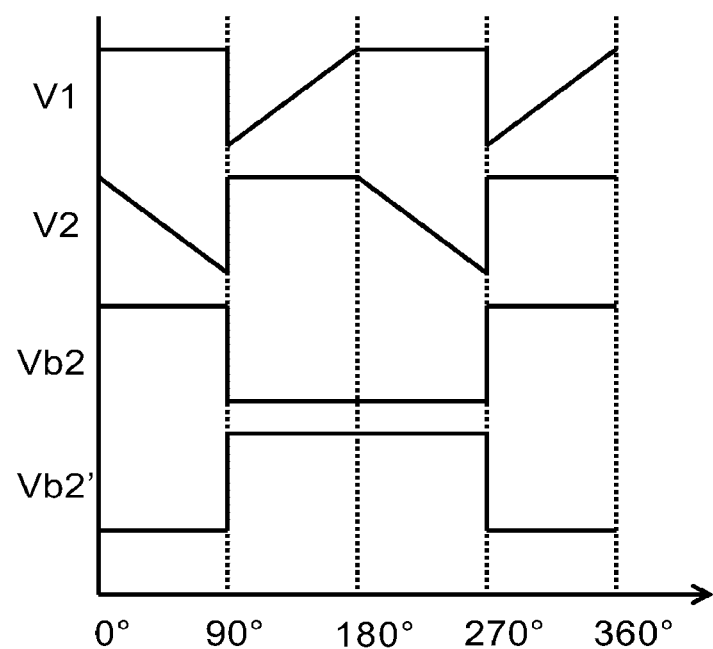
FIG. 2B illustrates exemplary control voltages for the phase-shifting-and-combining circuit in accordance with the disclosed embodiments.

Referring to the bottom-right portion of FIG. 2A, the active switches M2 and M2' can be used to extend the range of the phase shifter to 360°. More specifically, M2 and M2' can be turned ON one at a time depending on the need to introduce a 180-degree phase shift for input signal IN2. More specifically, the phase shifts for input signals IN1 and IN2 are related as follows. If IN1 experiences a phase shift of φ, IN2 will experience a phase shift of 90°φ or 270°−φ depending on the biases of M2 and M2'. Therefore, the phase difference between these two paths can vary from −90° to 90° in one case to 90° to 270° in the other case, thereby covering the full 360° range. This can be seen with reference to FIG. 2B, which illustrates control voltages that achieve various phase differences from 0° to 360° in accordance with the disclosed embodiments. More specifically, in the range from 0° to 90°, Vb2 and V1 are high, Vb2' is low, and V2 is varied from high to low to adjust the phase difference from 0° to 90°. In the range from 90° to 180°, Vb2' and V2 are high, Vb2 is low, and V1 is varied from low to high to adjust the phase difference from 90° to 180°. In the range from 180° to 270°, Vb2' and V1 are high, Vb2 is low, and V2 is varied from high to low to adjust the phase difference from 180° to 270°. Finally, in the range from 270° to 360°, Vb2 and V2 are high, Vb2' is low, and V1 is varied from low to high to adjust the phase difference from 270° to 360°.

Note that these control voltages can be generated in a number of possible ways and varied linearly or nonlinearly over their tuning range. For example, in one embodiment, the control voltages are generated by a circuit which includes a lookup table that provides digital control voltage values associated with specific phase differences. This circuit also includes a digital-to-analog (DAC) converter which converts the digital control values into corresponding analog voltages.

Figure 3A:
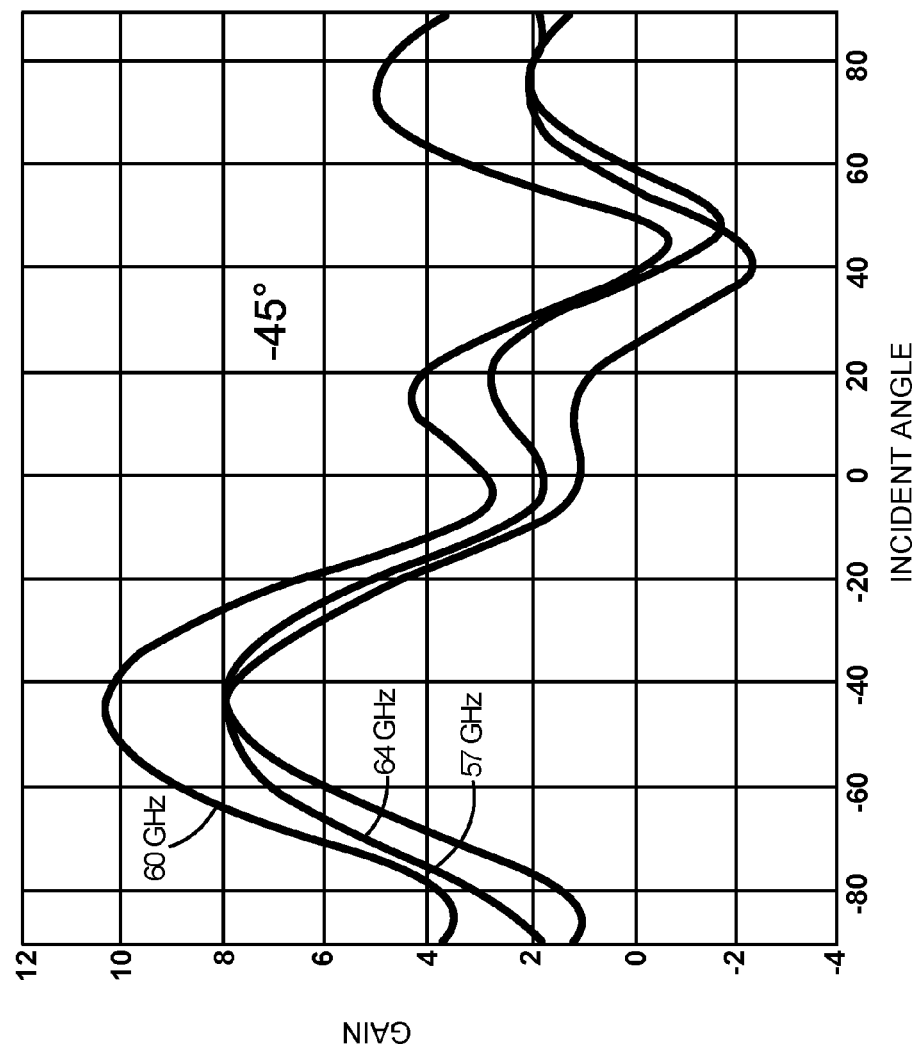
FIGS. 3A-3C illustrate gain as a function of incident angle for different frequencies and steering angles in accordance with the disclosed embodiments.
Figure 3B:
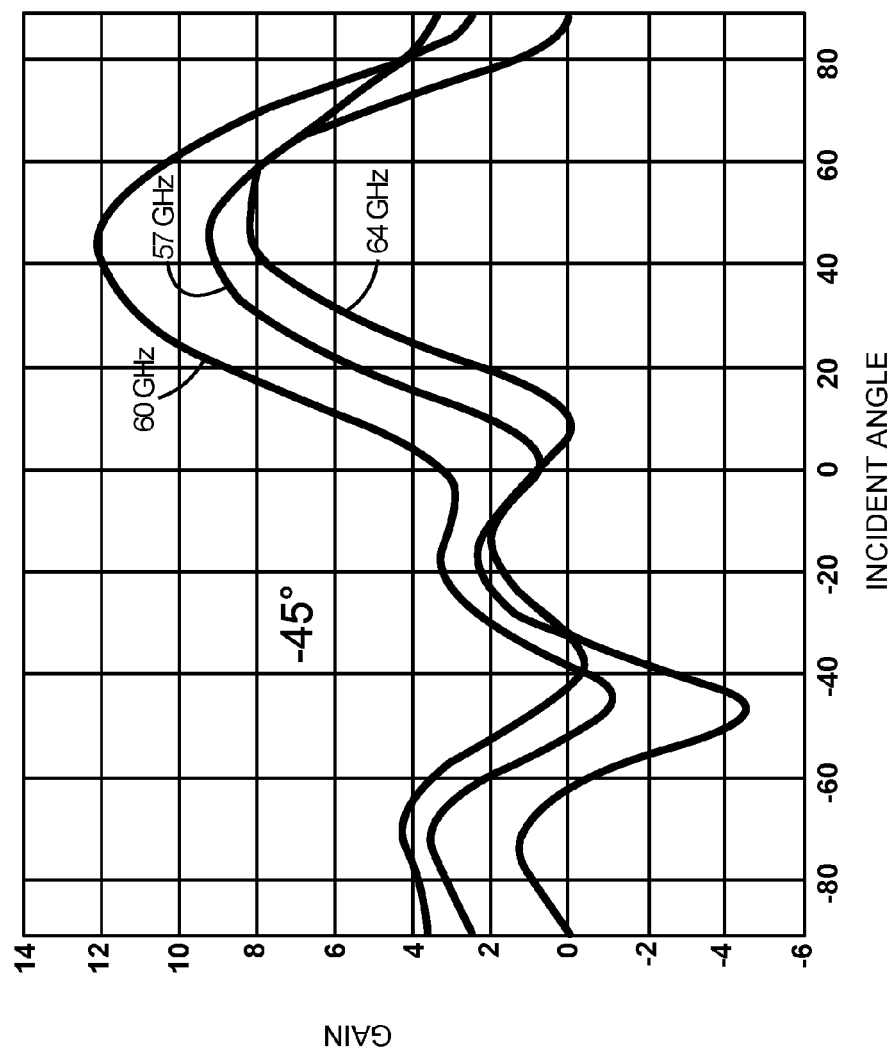
Figure 3C:
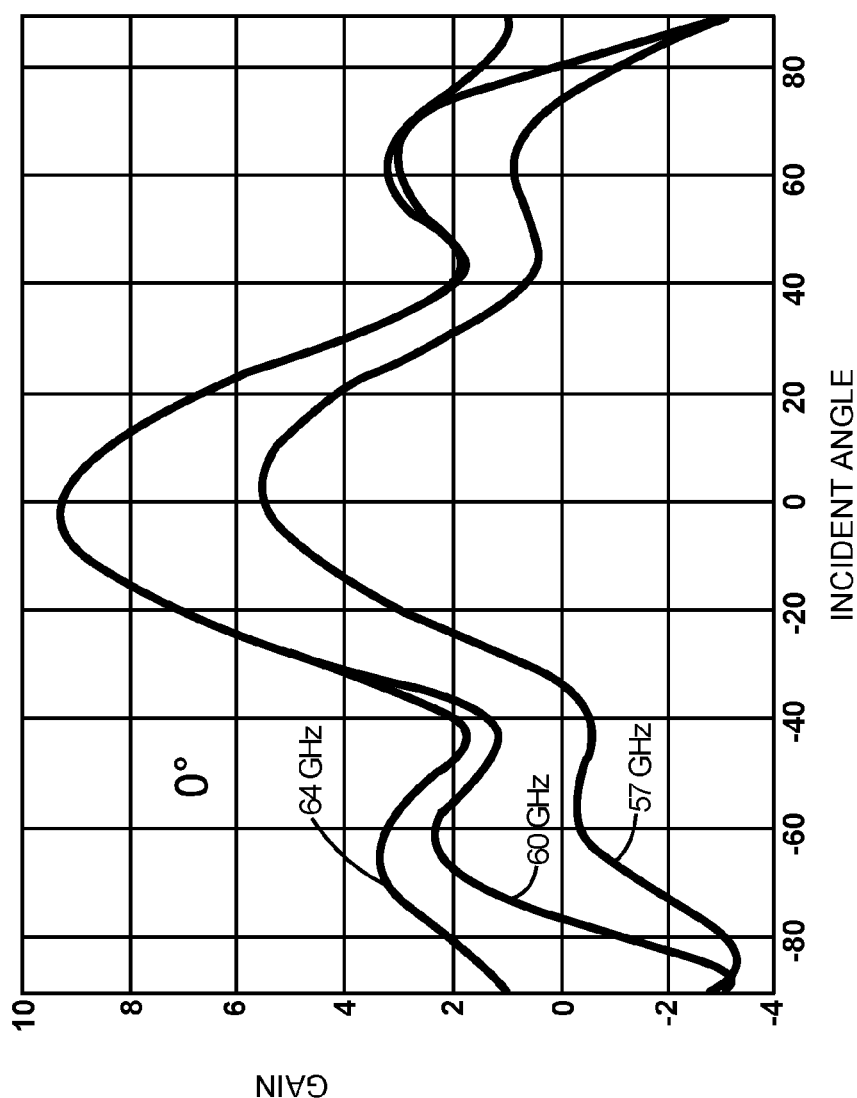

Simulated performance results for the above-described system appear in FIGS. 3A-3C, which illustrate gain as a function of incident angle for different frequencies and steering angles in accordance with the disclosed embodiments. More specifically, FIG. 3A illustrates gain as function of incident angle for a steering angle of −45° at three different frequencies, namely 57 GHz, 60 GHz and 64 GHz. Note that for each of these frequencies the gain peaks around −45°. Similarly, FIG. 3B presents a corresponding graph for a +45° steering angle, and FIG. 3C presents a corresponding graph for a 0° steering angle. Note that in FIGS. 3A, 3B and 3C the gains peak similarly at −45°, +45° and 0°, respectively.

Figure 3D:
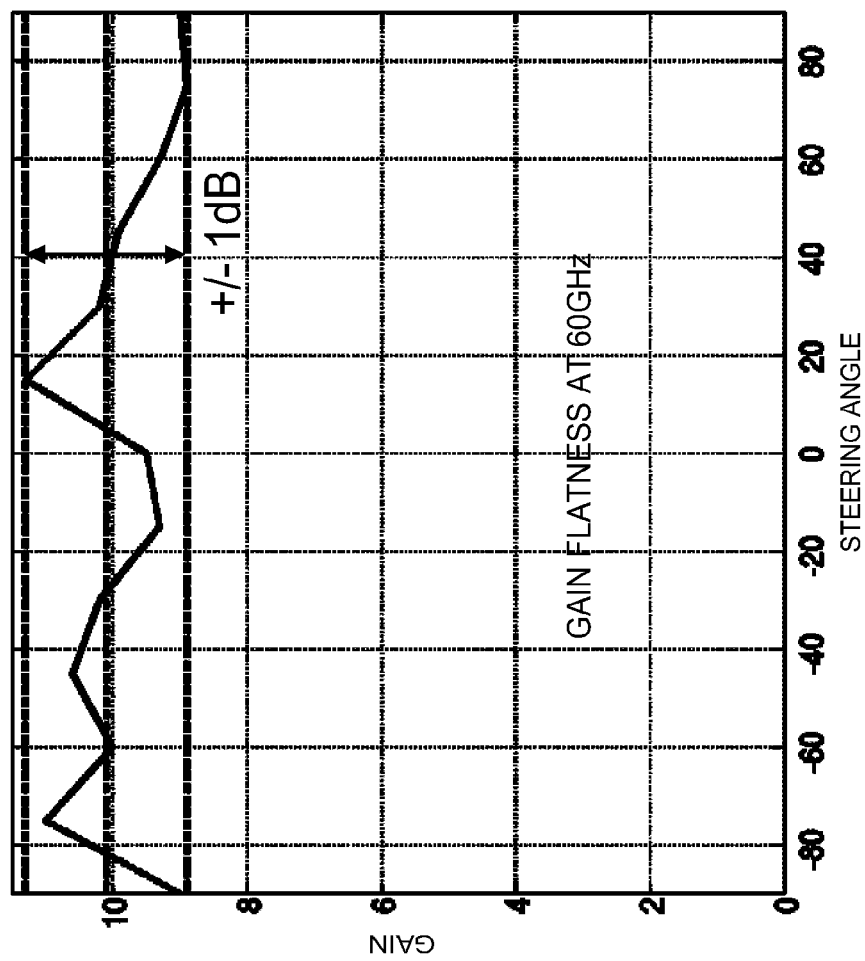
FIG. 3D illustrates maximum gain as a function of steering angle in accordance with the disclosed embodiments.

Finally, FIG. 3D illustrates peak gain as a function of steering angle for a 60 GHz frequency in accordance with the disclosed embodiments. As can be seen from this graph, the peak gain falls within a narrow ±1 dB band around a gain of approximately 10. This graph illustrates that the gain is substantially flat across a range of steering angles from −90° to +90°. Note that the gain should be similarly flat for steering angles from +90° to +270° when the 180° phase shift is activated in the circuit which appears in FIG. 2A.

Expandable Two-Input Circuit

Figure 4A:
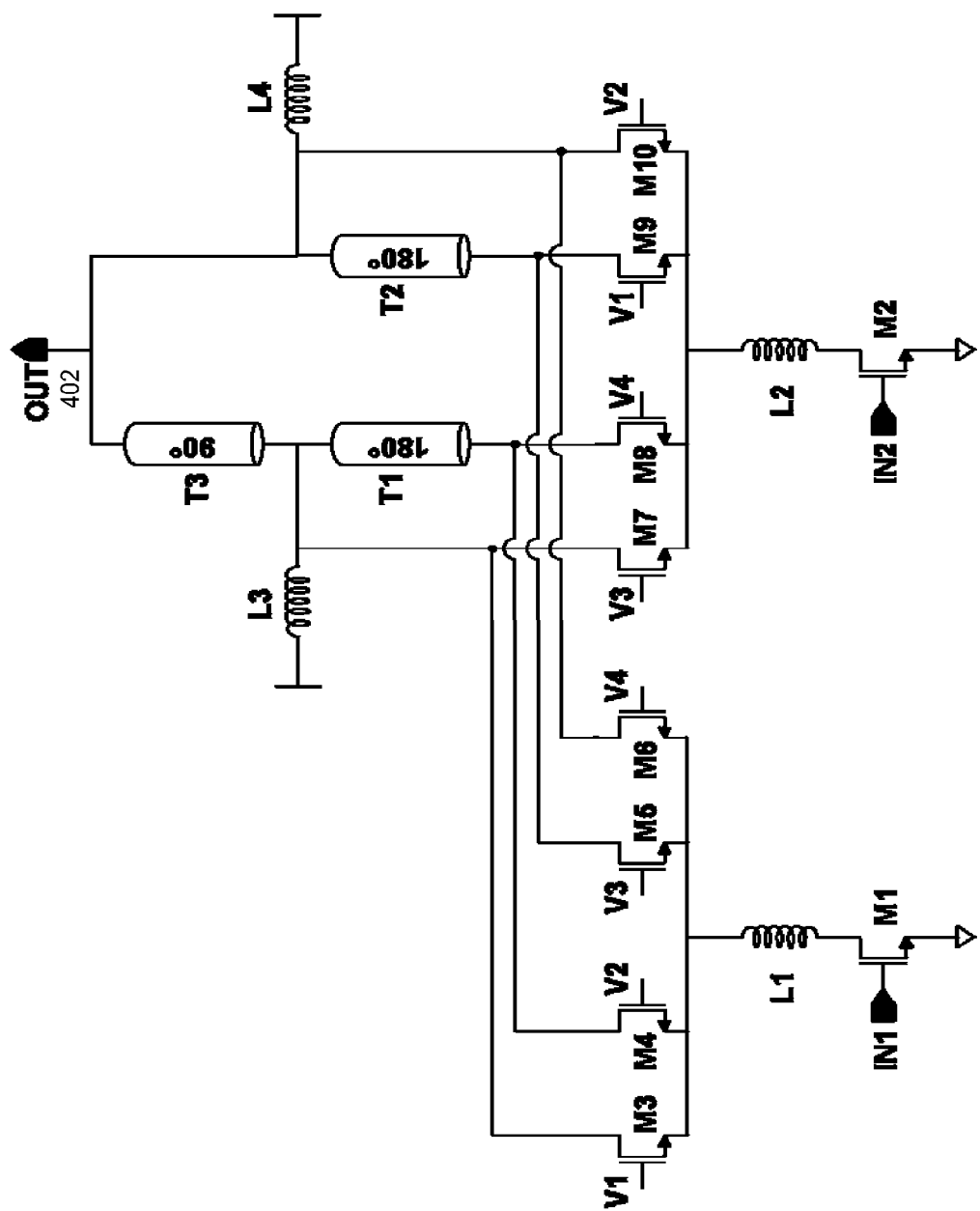
FIG. 4A illustrates the internal structure of an exemplary two-input phase-shifting-and-combining circuit in accordance with the disclosed embodiments.

FIG. 4A illustrates the internal structure of another implementation of a two-input phase-shifting-and-combining circuit in accordance with the disclosed embodiments. This two-input phase-shifting-and-combining circuit is expandable to four inputs as is described below with reference to FIGS. 5-7. During operation, this circuit receives two inputs, IN1 and IN2, from separate antennas. Signal IN1 passes through a common input transistor M1, and the output current from M1 feeds through transistors M3-M6 into four associated parallel paths. Note that the dividing ratio for the currents between the pathways is controlled by the bias voltages V1-V4 on the gates of M3-M6, respectively. Also, note that the optional inductor L1 is used to tune out the capacitance at the node which is located at the source of transistors M3-M4 and the drain of transistor M1, thereby increasing the bandwidth of this node. (Note that inductors L1-L4 in FIG. 4A are optional.)

Figure 4B:
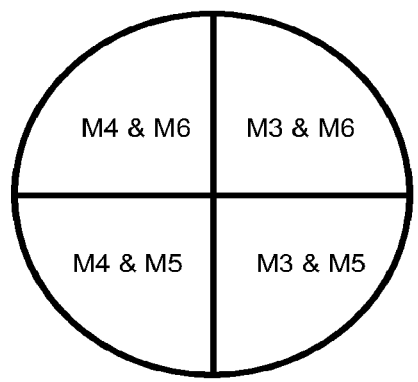
FIG. 4B presents a diagram that illustrates which steering transistors are used to achieve different steering angles in accordance with the disclosed embodiments.

For input signal IN1, the 180° and 90° transmission lines T1, T2 and T3 are selected by activating transistors M3-M6 such that, depending on which currents pass through transistors M3-M6, the resulting phase shift falls into one of the four quadrants as is illustrated in FIG. 4B.

Figure 4C:
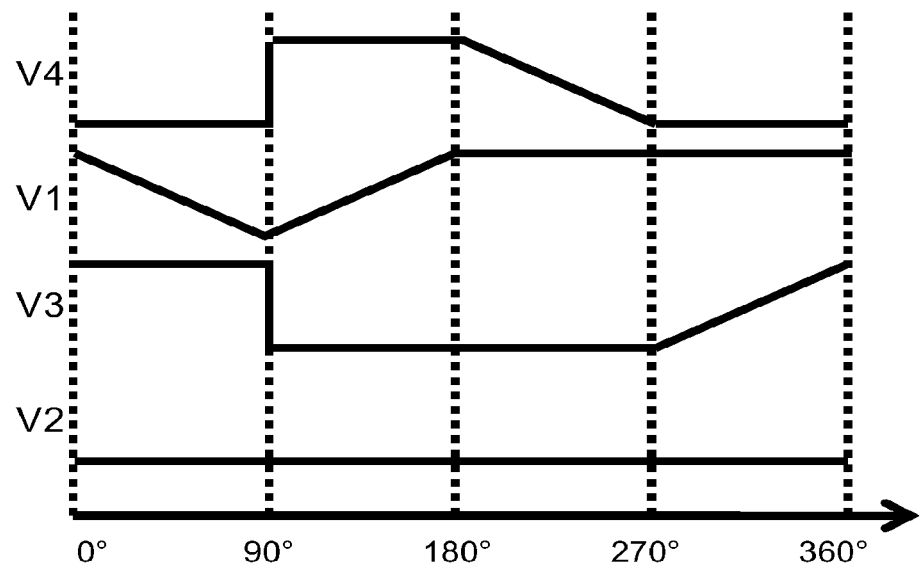
FIG. 4C illustrates exemplary control voltages for the two-input phase-shifting-and-combining circuit in accordance with the disclosed embodiments.

FIG. 4C, illustrates control voltages associated with applying various phase differences between the two inputs from 0° to 360° before summing them at output node in accordance with the disclosed embodiments. More specifically, in the range from 0° to 90°, V2 and V4 are low, V3 is high, and V1 is varied from high to low to adjust the phase difference from 0° to 90°. In the range from 90° to 180°, V2 and V3 are low, V4 is high, and V1 is varied from low to high to adjust the phase difference from 90° to 180°. In the range from 180° to 270°, V2 and V3 are low, V1 is high, and V4 is varied from high to low to adjust the phase difference from 180° to 270°. In the range from 270° to 360°, V2 and V4 are low, V1 is high, and V3 is varied from low to high to adjust the phase difference from 270° to 360°. As can be seen in FIG. 4C, V2 was kept low for all settings. Alternatively, various phase settings can be achieved while keeping V2 at high voltage. In addition, one might simplify the circuit by dispensing with M4 and M10 and having one less control voltage (V2) at the cost of losing symmetry.

Note that the output impedance of each transistor M3-M6 is strongly dependant on its bias voltage. Hence, a change in bias voltage for different phase settings will introduce gain variations. However, in the circuitry illustrated in FIG. 4A, the effective impedance at the output remains substantially constant across possible phase settings due to complementary impedance changes in parallel paths between the inputs to the outputs. As a result, the combined gain for all paths remains flat over all phase settings.

The above-described two-input circuit can be expanded to four inputs as is described in more detail below.

Four-Input Circuit

Figure 5:
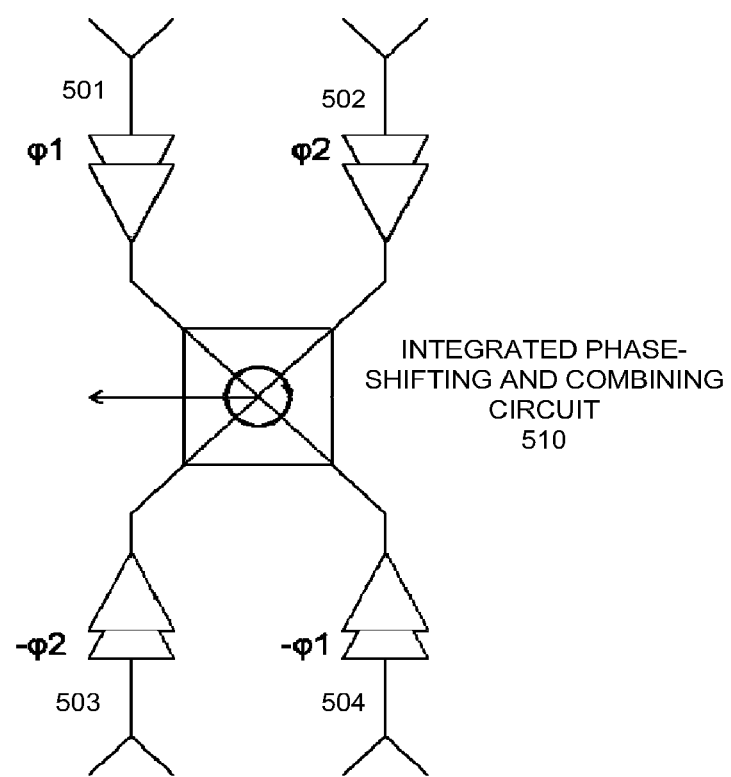
FIG. 5 illustrates four antenna elements coupled to a four-input phase-shifting-and-combining circuit in accordance with the disclosed embodiments.

FIG. 5 illustrates four antenna elements 501-504 coupled to a four-input integrated phase-shifting-and-combining circuit 510 in accordance with the disclosed embodiments. In this configuration, due to the symmetrical properties of the antenna locations, the phase of the four antenna elements 501-504 can be expressed as {φ1, −φ1} and {φ2, −φ2} with reference to the center of the array. Note that, in order to align the signals coming from these four antenna elements 501-504, their phase differences must be compensated for. For example, to align the signals from the four antenna elements 501-504 with a phase shift of 135°, the signal from antenna 501 can be phase shifted by 135°−φ1, the signal from antenna 504 can be phase shifted by 135°+φ1, the signal from antenna 502 can be phase shifted by 135°−φ2, and the signal from antenna 503 can be phase shifted by 135°+φ2. In this way, all of the four signals from antenna elements 501-504 will have the same phase 135° at the combining point.

Figure 6:
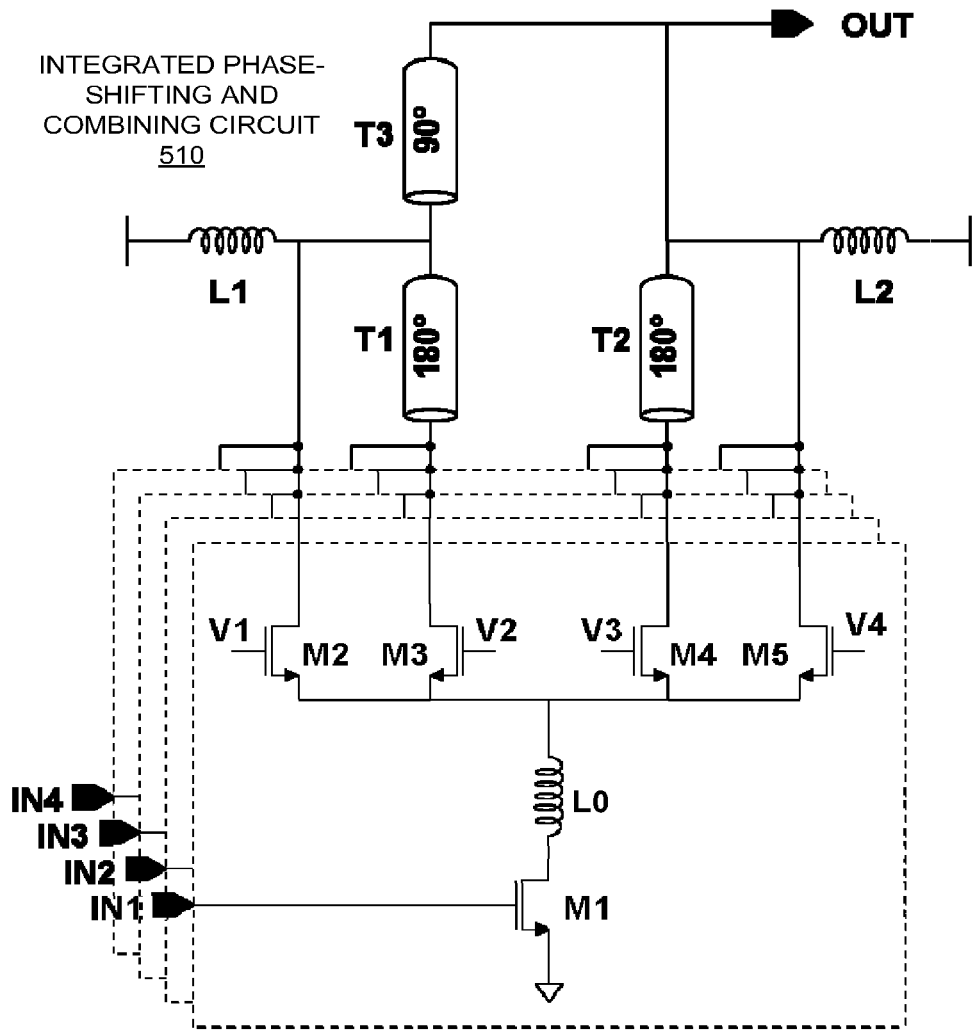
FIG. 6 illustrates the internal structure of a four-input phase-shifting-and-combining circuit in accordance with the disclosed embodiments.

FIG. 6 illustrates the internal structure of a four-input phase-shifting-and-combining circuit 510 in accordance with the disclosed embodiments. This circuit receives four input signals from separate antenna elements, including input signals IN1, IN2, IN3 and IN4. Input signal IN1 passes through a common input transistor M1, and the output current of M1 is divided into four paths through transistors M2-M5. The dividing ratio for these currents is controlled by the bias voltages V1-V4 on the gates of transistors M2-M5, respectively. Note that the optional inductor L0 is used to tune out the capacitance at the source of M2-M5 as well as the drain capacitance of M1, thereby increasing the bandwidth of this node. (Note that inductors L0-L2 in FIG. 6 are optional.) Also note that for input signal IN1 the 180° and 90° delay elements T1, T2 and T3 are selected by activating transistors M2-M5 to achieve a desired phase shift.

The circuit illustrated in FIG. 6 operates similarly to the circuit illustrated in FIG. 4A. However, the circuit delay elements T1, T2, T3, L1 and L2 are shared among four inputs, IN1-IN4. This sharing effectively reduces the total number of circuit components, and thereby reduces the size of the integrated phase-shifting-and-combining circuit. Note that delay elements T1, T2 and T3 can be implemented using inductors or transmission lines, which take up a lot of chip area, so reducing the number of delay elements can significantly reduce the overall chip area used by the circuitry.

Figure 7A:
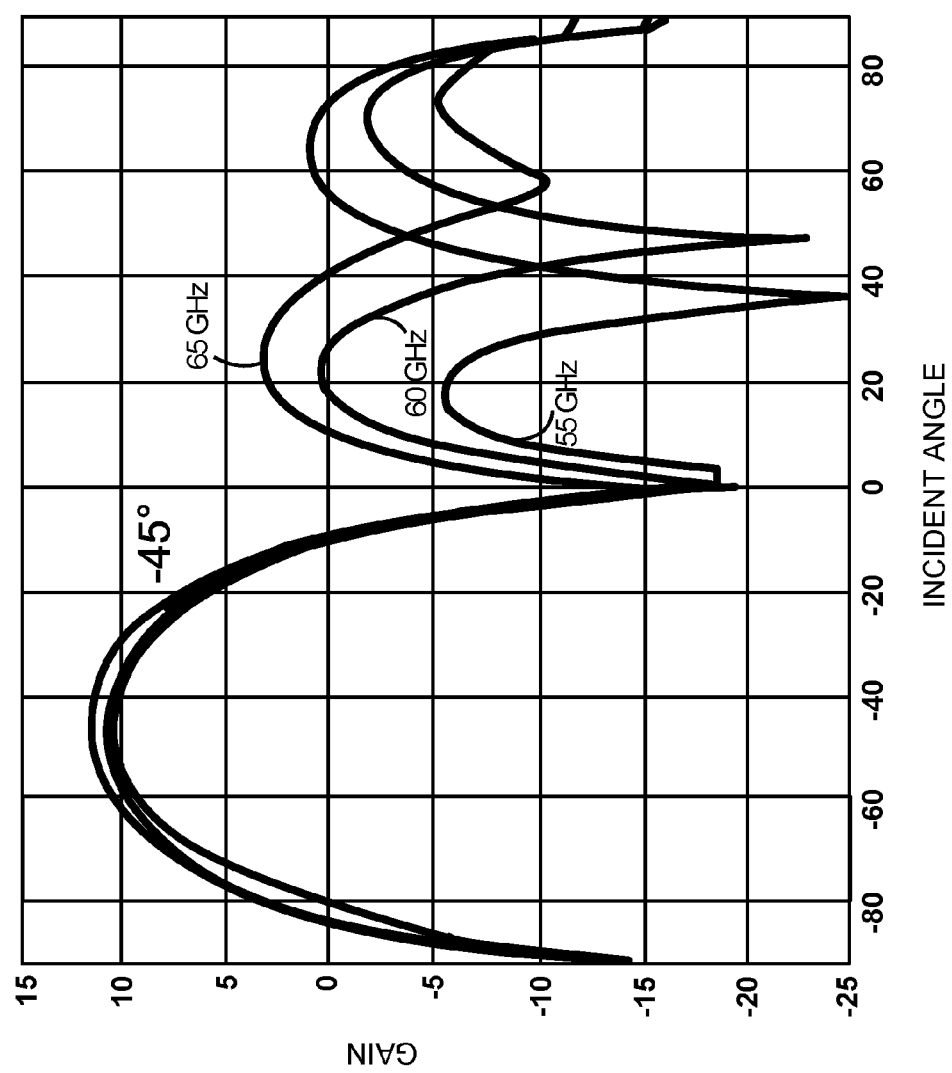
FIGS. 7A-C illustrate gain as a function of incident angle for different frequencies and steering angles in accordance with the disclosed embodiments.
Figure 7B:
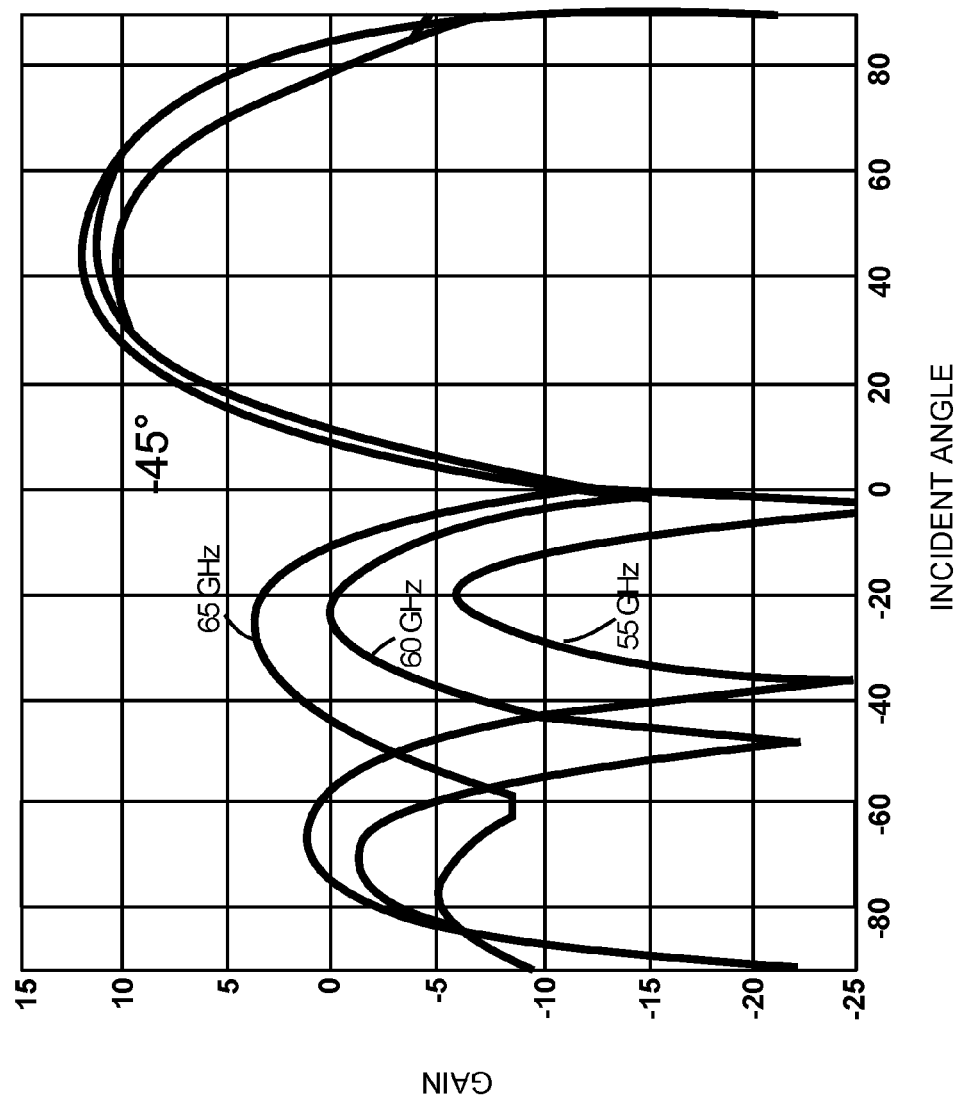
Figure 7C:
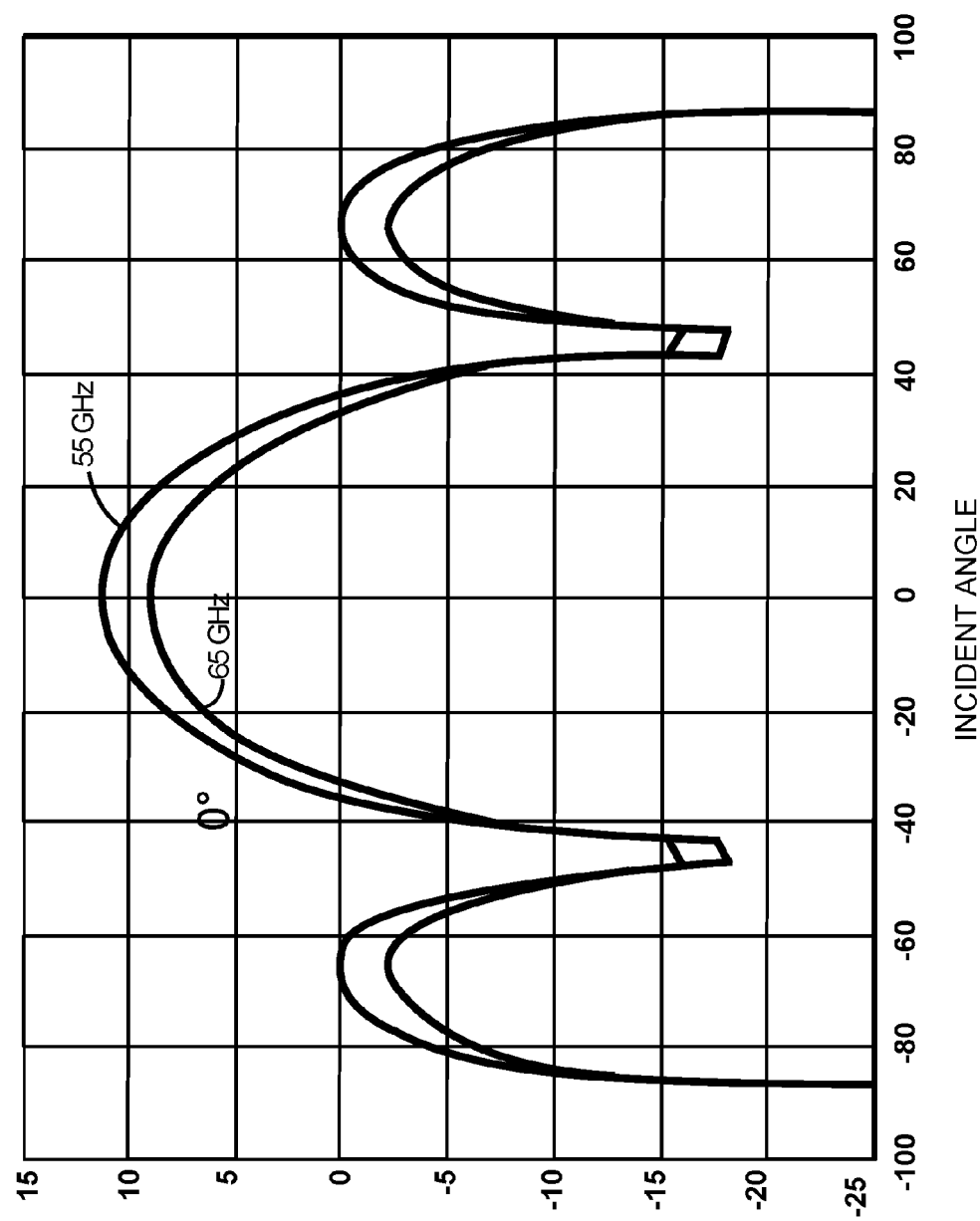

Simulated performance results for the above-described system appear in FIGS. 7A-7C, which illustrate gain as a function of incident angle for different frequencies and steering angles in accordance with the disclosed embodiments. More specifically, FIG. 7A illustrates gain as function of incident angle for a steering angle of −45° at three different frequencies, namely 55 GHz, 60 GHz and 65 GHz. Note that at each of these frequencies the gain peaks around −45°. Similarly, FIG. 7B presents a corresponding graph for a steering angle of +45° and FIG. 7C presents a corresponding graph for a steering angle of 0° for the 55 GHz and 65 GHz frequencies. Note that in FIGS. 7A, 7B and 7C the gains peak at −45°, +45° and 0°, respectively.

Figure 7D:
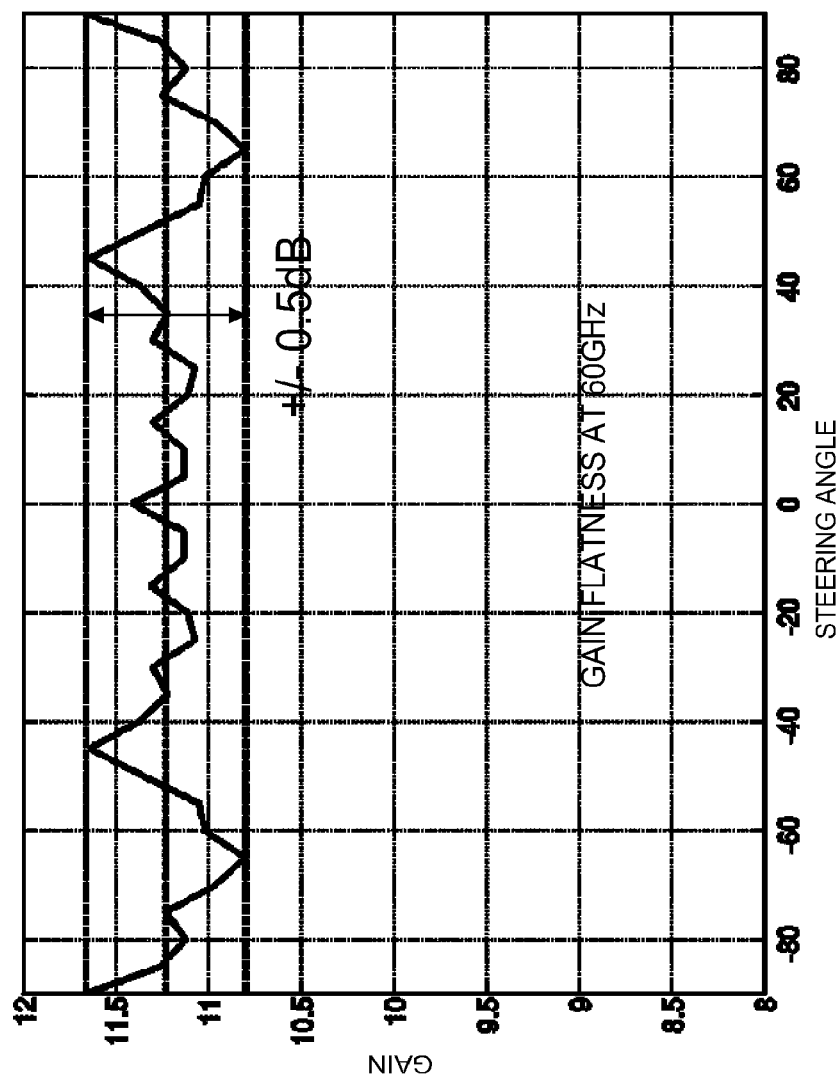
FIG. 7D illustrates maximum gain as a function of steering angle in accordance with the disclosed embodiments.

FIG. 7D illustrates peak gain as a function of steering angle for a 60 GHz frequency in accordance with the disclosed embodiments. As can be seen from this graph, the peak gain falls within a narrow ±0.5 dB band around an average gain of approximately 11.2 dB. This graph illustrates that the gain is substantially flat across a range of steering angles from −90° to +90°.

Current-Steering Process

Figure 8:
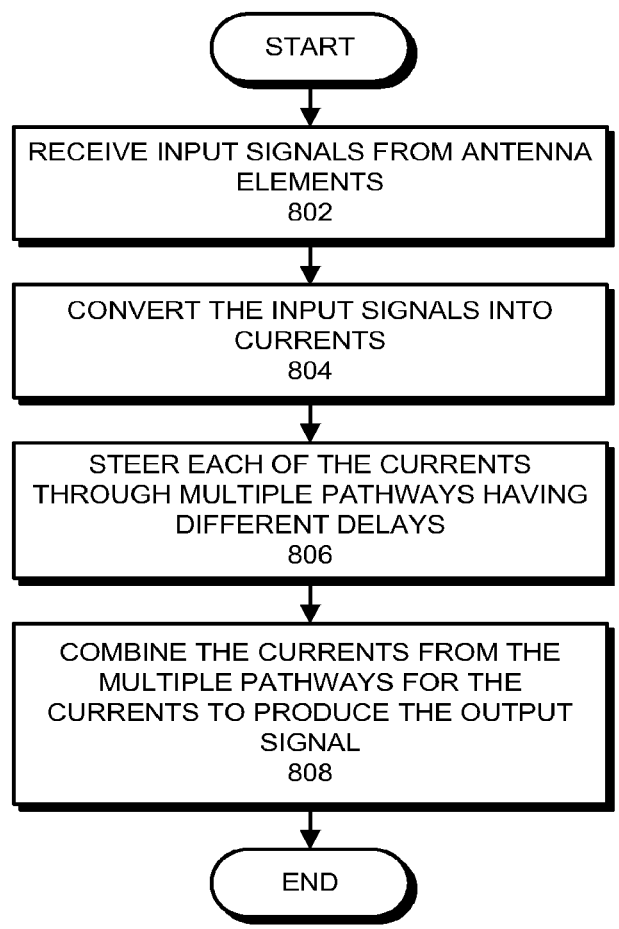
FIG. 8 presents a flow chart illustrating the current-steering process in accordance with the disclosed embodiments.

FIG. 8 presents a flow chart illustrating the current-steering process in accordance with the disclosed embodiments. First, the system receives input signals from the antenna elements (step 802). Next, the system uses transistors to convert the input signals into associated currents (step 804). The system then steers each of the associated currents through multiple pathways having different delays (step 806). Finally, the system combines currents from the multiple pathways for the associated currents to produce the output signal (step 808).

Electronic Device

Figure 9:
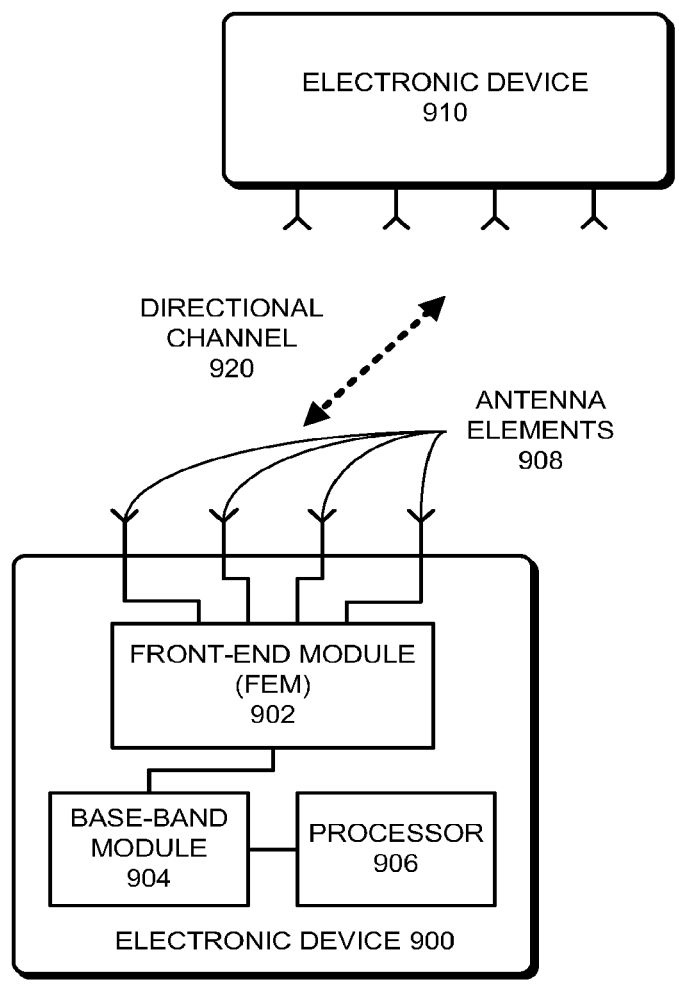
FIG. 9 illustrates an exemplary electronic device in accordance with the disclosed embodiments.

FIG. 9 illustrates an exemplary electronic device 900 in accordance with the disclosed embodiments. More specifically, FIG. 9 illustrates a first electronic device 900 which communicates with a second electronic device 910 through directional channel 920. This directional channel 920 is facilitated by the phase-shifting-and-combining circuitry described above. Electronic devices 900 and 910 can be part of a portable device, such as a laptop computer, a tablet computer, a mobile phone, a PDA, a portable media player, a digital camera, and/or another type of battery-powered electronic device. Alternatively, electronic devices 900 and 910 can include non-portable systems, such as a personal computer system, a server computer system, or any other type of system that can use directional communication.

As illustrated in FIG. 9, electronic device 900 includes a front-end module (FEM) 902, which connects to baseband module 904, wherein base-band module 904 is connected to processor 906. During operation, FEM 902 receives signals from (and possibly transmits signals to) antenna elements 908. Next, FEM 902 first performs down-conversion (and/or up-conversion) operations on the received signals, and also performs the phase-shifting-and-combining operations which are described above. The resulting phase-shifted-andcombined signals are then communicated to baseband module 904 and subsequently to processor 906 for additional processing.

Note that, by using the phase-shifting-and-combining circuitry described above, the transmitter on electronic device 910 and the receiver in electronic device 900 can steer directional channel 920 to each other.

Topologies

Figure 10A:
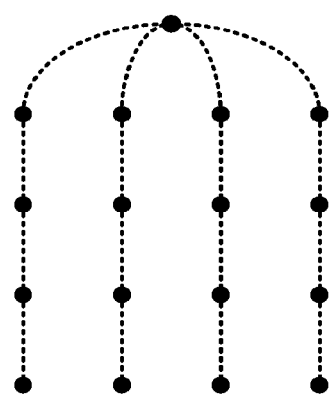
FIGS. 10A-B illustrate different topologies for systems comprised of two-input and four-input phase-shifting-and-combining modules in accordance with the disclosed embodiments.
Figure 10B:
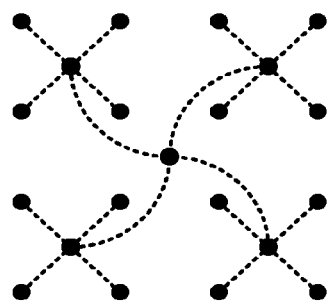

The two-input and four-input phase-shifting-and-combining modules described above can be used as building blocks in larger systems with different topologies. For example, FIG. 10A illustrates how a number of linear arrays of two input modules can be coupled together by a single four-input module to cover a planar layout of associated antenna elements. In contrast, FIG. 10B illustrates how a number of four-input modules can be coupled together to similarly facilitate a planar layout of associated antenna elements.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A system to support a phased-array antenna, comprising:
    a set of input terminals to receive input signals from antenna elements in the phased-array antenna;
    an integrated phase-shifting-and-combining circuit, which applies a specified phase shift to the input signals, and combines the phase-shifted input signals to produce an output signal, wherein the integrated phase-shifting-and-combining circuit comprises a current-steering circuit including:
        a plurality of current pathways having different delays;
        one or more input transistors to convert the input signals into respective currents; and
        one or more steering transistors to steer each of the respective currents through at least two of the plurality of current pathways to generate a plurality of delayed currents each having the different delays, wherein steering each of the respective currents through at least two of the plurality of current pathways comprises:
            causing complementary impedance changes through the plurality of current pathways; and
            causing an aggregate impedance at the output terminal to remain substantially constant; and
        a combining circuit to combine the plurality of delayed currents to generate the output signal; and
    an output terminal to output the output signal.

2. The system of claim 1,
    wherein the input signals comprise pairs of input signals; and
    wherein for each pair of input signals the integrated phase-shifting-and-combining circuit applies substantially opposite phase shifts to signals in the pair with respect to a reference phase at a midpoint between the input signals' phase.

3. The system of claim 1, wherein the plurality of current pathways each comprise respective delay elements causing the different delays, wherein a given delay element includes one of:
    an inductor;
    a transmission line; and
    an impedance network.

4. The system of claim 1, wherein the input signals comprise a first input signal and a second input signal, and
    wherein the one or more input transistors comprises:
        a first input transistor to convert the first input signal into a first current;
        a second input transistor to convert the second input signal into a second current;
    wherein the plurality of current pathways comprise:
        a 90-degree delay element with an input port and an output port, wherein the output port is coupled to the output terminal of the system;
        a first current path between the first input transistor and the output terminal;
        a second current path between the first input transistor and the input port of the 90-degree delay element;
        a third current path between the second input transistor and the output terminal;
        a fourth current path between the second input transistor and the input port of the 90-degree delay element; and
    wherein the one or more steering transistors comprises:
        a first steering transistor to control how much of the first current passes through the first current path;
        a second steering transistor to control how much of the first current passes through the second current path;
        a third steering transistor to control how much of the second current passes through the third current path; and
        a fourth steering transistor to control how much of the second current passes through the fourth current path; and
    wherein the integrated phase-shifting-and-combining circuit further comprises:
        control circuitry to convert the specified phase shift into control signals for the first, second, third and fourth steering transistors.

5. The system of claim 4,
    wherein the plurality of current pathways further comprises:
        a 180-degree delay element, which receives the second input signal and produces a modified second input signal;

wherein the one or more input transistors further comprises:
    a third input transistor to convert the modified second input signal into an alternative second current; and
wherein the integrated phase-shifting-and-combining circuit further comprises:
    an enablement mechanism to selectively enable either the second input transistor or the third input transistor to provide the second current.

6. The system of claim 1,
wherein the one or more input transistors comprises:
    a first input transistor to convert a given input signal into a source current;
wherein the plurality of current paths comprises:
    a first current path between the first input transistor and the output terminal;
    a second current path between the first input transistor and the output terminal, wherein the second current path includes one or more delay elements that provide a 90-degree delay;
    a third current path between the first input transistor and the output terminal, wherein the third current path includes a third steering transistor to control how much of the source c current path, wherein the third current path includes one or more delay elements that provide a 180-degree delay;
    a fourth current path between the first input transistor and the output terminal, wherein the fourth current path includes one or more delay elements that provide a 270-degree delay; and
wherein the one or more steering transistors comprises:
    a first steering transistor to control how much of the first current passes through the first current path;
    a second steering transistor to control how much of the first current passes through the second current path;
    a third steering transistor to control how much of the second current passes through the third current path; and
    a fourth steering transistor to control how much of the second current passes through the fourth current path; and
wherein the integrated phase-shifting-and-combining circuit further comprises:
    control circuitry to convert the specified phase shift into control signals for the first, second, third and fourth steering transistors.

7. The system of claim 6,
wherein the first current path includes no delay elements;
wherein the second current path includes a 90-degree delay element;
wherein the third current path includes a first 180-degree delay element; and
wherein the fourth current path includes a second 180-degree delay element and shares the 90-degree delay element with the second current path to effectively provide a 270-degree delay.

8. The system of claim 6, wherein there are four input signals.

9. A method for phase-shifting and combining signals received from a phased-array antenna, comprising:
    receiving, by a set of input terminals, input signals from antenna elements in the phased-array antenna; and
    applying, by an integrated phase-shifting-and-combining circuit, a specified phase shift to the input signals, wherein applying the phase shift comprises:
        converting, by one or more input transistors, the input signals into respective currents;
        steering, by one or more steering transistors, each of the respective currents through at least two of a plurality of current pathways having different delays to generate a plurality of delayed currents each having the different delays, wherein steering each of the respective currents through at least two of a plurality of current pathways comprises:
            causing complementary impedance changes through the multiple pathways; and
            causing an aggregate impedance at the output terminal to remain substantially constant; and
        combining, by a combining circuit, the plurality of delayed currents to produce an output signal; and
        outputting, by an output terminal, the output signal.

10. The method of claim 9,
wherein the input signals comprise pairs of input signals; and
wherein for each pair of input signals applying the specified phase shift involves applying substantially opposite phase shifts to signals in the pair with respect to a reference phase at a midpoint between the input signals' phase.

11. The method of claim 9, wherein the plurality of current pathways each comprise respective delay elements causing the different delays, wherein a given delay element includes one of:
    an inductor;
    a transmission line; and
    an impedance network.

12. A circuit to support a phased-array antenna, comprising:
    a set of interconnected phase-shifting-and-combining components which collectively process signals from antenna elements in the phased-array antenna, wherein each phase-shifting-and-combining component includes:
        a set of input terminals to receive input signals from antenna elements in the phased-array antenna;
        an integrated phase-shifting-and-combining circuit, which applies a specified phase shift to the input signals, and combines the phase-shifted input signals to produce an output signal, wherein the integrated phase-shifting-and-combining circuit comprises a current-steering circuit including:
            a plurality of current pathways having different delays;
            one or more input transistors to convert the input signals into respective currents; and
            one or more steering transistors to steer each of the respective currents through at least two of the plurality of current pathways to generate a plurality of delayed currents each having the different delays, wherein steering each of the respective currents through at least two of the plurality of current pathways comprises:
                causing complementary impedance changes through the plurality of current pathways; and
                causing an aggregate impedance at the output terminal to remain substantially constant; and
            a combining circuit to combine the plurality of delayed currents to generate the output signal; and
        an output terminal to output the output signal.

13. The circuit of claim 12,
wherein for a given phase-shifting-and-combining component in the set of interconnected phase-shifting-and-combining components, the input signals comprise pairs of input signals; and for each pair of input signals the integrated phase-shifting-and-combining circuit applies substantially opposite phase shifts to signals in the pair with respect to a reference phase at a midpoint between the input signals' phase.

14. The circuit of claim 12, wherein the plurality of current pathways each comprise respective delay elements causing the different delays, wherein a given delay element includes one of:
an inductor;
a transmission line; and
an impedance network.

15. A system which includes a set of antenna elements, comprising:
the set of antenna elements; and
a set of interconnected phase-shifting-and-combining components which collectively process signals from antenna elements in the set of antenna elements, wherein each phase-shifting-and-combining component includes:
a set of input terminals to receive input signals from antenna elements in the phased-array antenna; and
an integrated phase-shifting-and-combining circuit, which applies a specified phase shift to the input signals, and combines the phase-shifted input signals to produce an output signal, wherein the integrated phase-shifting-and-combining circuit comprises a current-steering circuit including:
a plurality of current pathways having different delays;
one or more input transistors to convert the input signals into respective currents; and
one or more steering transistors to steer each of the respective currents through at least two of the plurality of current pathways to generate a plurality of delayed currents each having the different delays; and
a combining circuit to combine the plurality of delayed currents to generate the output signal; and
an output terminal to output the output signal.

16. A circuit to support a set of antenna elements, comprising:
a first input terminal to receive a first input signal from a first antenna element in the set of antenna elements;
a second input terminal to receive a second input signal from a second antenna element in the set of antenna elements; and
an integrated phase-shifting-and-combining circuit, which applies a specified phase shift to the first and the second input signals, and combines the phase-shifted first and second input signals to produce an output signal, wherein the integrated phase-shifting-and-combining circuit comprises a current-steering circuit including:
a plurality of current pathways having different delays;
one or more input transistors to convert the input signals into respective currents; and
one or more steering transistors to steer each of the respective currents through at least two of the plurality of current pathways to generate a plurality of delayed currents each having the different delays, wherein steering each of the respective currents through at least two of the plurality of current pathways comprises:
causing complementary impedance changes through the plurality of current pathways; and
causing an aggregate impedance at the output terminal to remain substantially constant; and
a combining circuit to combine the plurality of delayed currents to generate the output signal; and
an output terminal to output the output signal.

17. The circuit of claim 16, wherein the integrated phase-shifting-and-combining circuit comprises:
a first input transistor to convert the first input signal into a first current;
a second input transistor to convert the second input signal into a second current;
a 90-degree delay element with an input port and an output port, wherein the output port is coupled to the output terminal of the system;
a first current path between the first input transistor and the output terminal;
a second current path between the first input transistor and the input port of the 90-degree delay element;
a third current path between the second input transistor and the output terminal;
a fourth current path between the second input transistor and the input port of the 90-degree delay element; and
wherein the one or more steering transistors comprises:
a first steering transistor to control how much of the first current passes through the first current path;
a second steering transistor to control how much of the first current passes through the second current path;
a third steering transistor to control how much of the second current passes through the third current path; and
a fourth steering transistor to control how much of the second current passes through the fourth current path; and
wherein the integrated phase-shifting-and-combining circuit further comprises:
control circuitry to convert the specified phase shift into control signals for the first, second, third and fourth steering transistors.

18. The circuit of claim 17, wherein the integrated phase-shifting-and-combining circuit further comprises:
a 180-degree delay element, which receives the second input signal and produces a modified second input signal;
a third input transistor to convert the modified second input signal into an alternative second current; and
an enablement mechanism to selectively enable either the second input transistor or the third input transistor to provide the second current.

19. A circuit to support a set of antenna elements, comprising:
a first input terminal to receive a first input signal from a first antenna element in the set of antenna elements;
a second input terminal to receive a second input signal from a second antenna element in the set of antenna elements;
a third input terminal to receive a third input signal from a third antenna element in the set of antenna elements;
a fourth input terminal to receive a fourth input signal from a fourth antenna element in the set of antenna elements; and
an integrated phase-shifting-and-combining circuit, which applies a specified phase shift to the first, second, third and fourth input signals, and combines the phase-shifted first, second, third and fourth input signals to produce an output signal, wherein the integrated phase-shifting-and-combining circuit comprises a current-steering circuit including:
a plurality of current pathways having different delays;

one or more input transistors to convert the input signals into respective currents; and one or more steering transistors to steer each of the respective currents through at least two of the plurality of current pathways to generate a plurality of delayed currents each having the different delays, wherein steering each of the respective currents through at least two of the plurality of current pathways comprises:

causing complementary impedance changes through the plurality of current pathways; and causing an aggregate impedance at the output terminal to remain substantially constant; and a combining circuit to combine the plurality of delayed currents to generate the output signal; and an output terminal to output the output signal.

20. The circuit of claim 19, wherein for a given input signal, the integrated phase-shifting-and-combining circuit includes:

an input transistor to convert the given input signal into a source current;

a first current path between the first input transistor and the output terminal;

a second current path between the first input transistor and the input port of the 90-degree delay element;

a third current path between the second input transistor and the output terminal;

wherein the third current path includes one or more delay elements that provide a 180-degree delay;

a fourth current path between the input transistor and the output terminal wherein the fourth current path includes one or more delay elements that provide a 270-degree delay; and control circuitry to convert the specified phase shift into control signals for the first, second, third and fourth steering transistors.

21. The circuit of claim 20, wherein the first current path includes no delay elements;

wherein the second current path includes a 90-degree delay element;

wherein the third current path includes a first 180-degree delay element; and wherein the fourth current path includes a second 180-degree delay element and shares the 90-degree delay element with the second current path to effectively provide a 270-degree delay.

* * * * *